United States Patent
Pagano et al.

(10) Patent No.: US 6,698,483 B2
(45) Date of Patent: Mar. 2, 2004

(54) PRODUCT BASED ON RUBBER, A PROCESS FOR OBTAINING THE PRODUCT, TIRE MADE FROM THE RUBBER-BASED PRODUCT AND PROCESS FOR REDUCING THE ROLLING ASSISTANCE OF THE SAID TIRE

(75) Inventors: Salvatore Pagano, Clermont-Ferrand (FR); Lucette Dumergue, St. Beauzier (FR); Emmanuelle Pornet, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 291 days.

(21) Appl. No.: 09/756,407

(22) Filed: Jan. 8, 2001

(65) Prior Publication Data

US 2001/0034395 A1 Oct. 25, 2001

Related U.S. Application Data

(63) Continuation of application No. PCT/EP00/03944, filed on May 3, 2000.

(30) Foreign Application Priority Data

May 7, 1999 (FR) .............................. 99 05892

(51) Int. Cl.$^7$ .............................. B60C 1/00; B60C 9/18
(52) U.S. Cl. ...................... 152/532; 152/526; 152/549; 152/555; 524/174; 524/176
(58) Field of Search ................................. 152/526, 537, 152/539, 532, 548, 549, 555, 564; 524/174, 176

(56) References Cited

U.S. PATENT DOCUMENTS

| | | | |
|---|---|---|---|
| 2,912,355 A | * | 11/1959 | Formanek ................... 152/565 |
| 3,324,100 A | | 6/1967 | Kraus |
| 4,722,977 A | * | 2/1988 | Fischer ....................... 525/320 |
| 4,874,670 A | | 10/1989 | Boon et al. |
| 5,036,113 A | | 7/1991 | Boon et al. |
| 5,040,583 A | | 8/1991 | Lin et al. |
| 5,156,921 A | | 10/1992 | Lin et al. |
| 5,194,478 A | * | 3/1993 | Frandsen et al. ........... 524/398 |
| 5,236,030 A | | 8/1993 | Misawa et al. |
| 5,387,368 A | * | 2/1995 | Nishimura et al. .... 252/188.28 |

FOREIGN PATENT DOCUMENTS

| | | | |
|---|---|---|---|
| AU | 3434195 | | 10/1995 |
| EP | 0157079 | | 1/1985 |
| EP | 0337279 | | 4/1989 |
| EP | 0507207 | | 3/1992 |
| EP | 0864606 | * | 9/1998 |
| JP | 49004300 | | 1/1974 |
| JP | 09151276 | * | 6/1997 |
| WO | WO9924502 | | 5/1999 |

* cited by examiner

*Primary Examiner*—Michael W. Bali
*Assistant Examiner*—Justin Fischer
(74) *Attorney, Agent, or Firm*—Baker Botts L.L.P.

(57) ABSTRACT

The present invention provides a rubber-based product usable as a tire cover which is composed of a buffer zone and a zone sensitive to oxidation (sensitive zone), the buffer zone being capable of trapping oxygen external to the product so as to protect from oxidation at least one sensitive zone of the product. The buffer zone contains a basic composition composed of at least one elastomer containing at least one salt of iron (III) provided to activate oxidation in the composition. Preferably, the salt is an iron (III) salt of a carboxylic acid having the general formula $C_nH_{2n}O_2$ in which n is from 2 to 5. This product is produced by mechanically incorporating the iron (III) salt into the elastomer or elastomers contained in the composition for the buffer zone. The invention is advantageously applied in a tire cover, and imparts improved rolling resistance.

9 Claims, No Drawings

PRODUCT BASED ON RUBBER, A PROCESS FOR OBTAINING THE PRODUCT, TIRE MADE FROM THE RUBBER-BASED PRODUCT AND PROCESS FOR REDUCING THE ROLLING ASSISTANCE OF THE SAID TIRE

The present application is a continuation of International Application No. PCT/EP 00/03944, filed May 3, 2000, now WO 00/68309.

BACKGROUND OF THE INVENTION

The present invention concerns a product based on rubber, the process for obtaining it, a tire made from the product and a process for reducing the rolling resistance of the tire.

One of the main concerns of tire manufacturers is to increase the life of tires. In particular, it is important to improve the endurance of tires in relation to oxidizing processes of the rubber compositions, the metallic or textile reinforcement thereof and the interfaces between such compositions and reinforcements in the tires.

A known method of reducing these oxidation phenomena involves restricting the amount of oxygen coming from the tire inflation air or from the atmosphere outside the tire that gets to a zone of the tire cover that is particularly sensitive to oxidation. For a very long time this has been accomplished using a layer of butyl rubber, which is substantially impermeable to oxygen, that is applied to the inside wall of the tire covers. Unfortunately, butyl rubber is not totally impermeable and the flow of oxygen into the body of the cover, though reduced, produces undesirable oxidation phenomena over the long term.

Other materials that are even more impermeable than butyl rubber have been proposed for the same purpose, as described in, for example, U.S. Pat. Nos. 5,236,030 4,874, 670, 5,036,113, 5,040,583 and 5,156,921 and European Patent Application EP-A 337 279. The materials disclosed in these references, however, are expensive and their use in tire covers is associated with a number of problems.

Another way to avoid oxidation problems is to trap the oxygen chemically by the accelerated thermal oxidation of a rubber composition that acts as a buffer, located between a main source of oxygen and the zone to be protected against oxidation phenomena. For example, such a buffer composition may be located between the inside face of the tire cover, coated with butyl rubber, and the carcass ply to reduce the amount of oxygen that comes into contact with the carcass ply from the inflation air, especially in tire covers intended for fitting to vehicles that carry heavy loads.

To accelerate oxygen fixation, such buffer compositions may contain a metallic salt that catalyzes oxidation, in particular a cobalt salt. The salt acts by activating homolytic decomposition of the hydroperoxides generated during aging brought about by the aforementioned said oxidation phenomena. The salt is introduced into the buffer composition, preferably in amounts of 0.2 to 0.3 pbw (parts by weight of cobalt equivalent per 100 parts by weight of the elastomer). This increases the amount of oxygen that can be trapped by the buffer composition by around 50 to 100% compared with the same composition containing no cobalt salt.

Unfortunately, improvement in the oxidation-related behavior is accompanied by a substantial increase of the hysteresis losses of the buffer composition because of the considerable quantity of cobalt salt introduced. This increase of the hysteresis losses leads to self-heating of the composition, which results in a shorter life, contrary to the purpose intended, and an undesirable increase of the rolling resistance, which should also be avoided since decreased rolling resistance provides reduced fuel consumption.

For these reasons the use of such buffer compositions, attractive while potentially, has not developed as expected.

European patent application EP-A-507 207 describes a method for trapping oxygen by means of an elastomeric buffer composition contained in a wrapping layer. The buffer composition is characterized by the presence of a transitional metal salt provided to activate oxygen fixation. As explained above, cobalt salts are the preferred metal salts, with, other metals, such as manganese or iron also envisaged, but not in relation to specified salts.

SUMMARY OF THE INVENTION

The present invention provides a rubber-based product useful as a tire cover which comprises one or more buffer zones being provided in order to trap oxygen external to the product and one or more zones of the tire cover that are sensitive to oxidation phenomena (sensitive zones), wherein the buffer zone protects the sensitive zones of the product from oxidation. In accordance with the invention, the buffer zone of the product contains a basic composition composed of at least one elastomer containing at least one salt of iron (III) provided to activate oxidation in the composition. Preferably the salt is an iron (III) salt of a carboxylic acid having the general formula $C_nH_{2n}O_2$ in which n is 2 to 5. Particularly preferred salts include iron (III) pentanoate and iron (III) acetate.

In accordance with the invention, the quantity of the invention iron (III) salt in the composition preferably ranges from 0.01 to 0.03 pbw of equivalent iron, where "pbw" means "parts by weight per 100 parts by weight of the elastomer or totality of elastomers present in the composition". More preferably still, the quantity of iron (III) salt invention ranges from 0.01 to 0.02 pbw of equivalent iron.

The buffer zone composition is prepared incorporating the iron (III) salt into the elastomer or elastomers by mechanical working.

The buffer zone composition is advantageously applied in a tire cover and inparts improved rolling resistance to the tire.

DETAILED DESCRIPTION OF THE INVENTION

The buffer zone composition according to the invention is based on natural or synthetic rubber, or a blend of two or more such rubbers. Synthetic rubbers suitable for use in the composition according to the invention include diene rubbers, such as polyisoprene and polybutadiene, monoolefin rubbers, such as polychloroprene and polyisobutylene, styrene-butadiene and styrene-butadiene-isoprene copolymers, acrylonitrile-butadiene-styrene, copolymers and ethylene-propylene-diene terpolymers. Diene rubbers are preferred synthetic rubbers, in particular any homopolymer obtained by polymerization of a conjugated diene monomer having 4 to 12 carbon atoms, or any copolymer obtained by co-polymerization of one or more dienes conjugated either between themselves or with one or more vinyl aromatic compounds having from 8 to 20 carbon atoms.

Suitable conjugated dienes include, 1,3-butadiene, 2-methyl-1,3-butadiene, 2,3-di(C1 to C5 alkyl)-1,3-butadienes such as, 2,3-dimethyl-1,3-butadiene, 2,3-diethyl- 1,3-butadiene, 2-methyl-3-ethyl-1,3-butadiene, 2-methyl-3-isopropyl-1,3-butadiene and phenyl-1,3-butadiene, 1,3-pentadiene and 2,4-hexadiene.

Suitable vinyl aromatic compounds include, styrene, ortho-, meta- and para-methylstyrene, the commercial mixture "vinyl-toluene", para-tertiobutylstyrene, the methoxy-styrenes, the chloro-styrenes, vinylmesitylene, divinyl benzene, vinyl naphthalene, etc.

The co-polymers may contain between 99% and 20% by weight of diene units and between 1% and 80% by weight of vinyl aromatic units.

The polymers may have any microstructure, which is a function of the polymerization conditions used, in particular the presence or absence of a modifying and/or randomizing agent and the quantities of modifying and/or randomizing agent used. The polymers include block, statistical, sequenced or micro-sequenced polymers, and may be prepared in a dispersion or in solution.

Preferred synthetic diene rubbers include polybutadienes, in particular those having a content of 1,2-units between 4% and 80% and those having a content of cis-1,4 bonds of more than 90%, the polyisoprenes, and butadiene-styrene co-polymers, in particular those having a styrene content between 5% and 50% by weight, more particularly between 20% and 40% by weight, a content of 1,2-bonds of the butadiene part between 4% and 65%, and a content of trans-1,4 bonds between 30% and 80%, these having a total aromatic compound content between 5% and 50%, and a glass transition temperature (Tg) between 0° C. and 80° C., and those having a styrene content of between 25% and 30% by weight, a content of vinyl bonds of the butadiene part between 55% and 65%, a content of trans-1,4 bonds between 20% and 25% and a glass transition temperature between −20° C. and −30° C.

Suitable butadiene-styrene-isoprene co-polymers, include those having a styrene content between 5% and 50% by weight, more particularly between 10% and 40%, an isoprene content between 15% and 60% by weight, more particularly between 20% and 50% by weight, a butadiene content between 5% and 50%, more particularly between 20% and 40% by weight, a content of 1,2-units of the butadiene part between 4% and 85%, a content of trans-1,4 units of the butadiene part between 6% and 80%, a content of 1,2-plus 3,4-units of the isoprene part between 5% and 70%, and a content of trans-1,4 units of the isoprene part between 10% and 50%.

The synthetic rubbers may be coupled and/or starred or alternatively functionalized with a coupling and/or starring or functionalizing agent.

These rubbers may be vulcanized and/or cross-linked by any of the known agents, including as sulphur, peroxides, and bismaleimides.

The composition according to the invention contains usual fillers and additives, such as carbon black, silica or any other reinforcing filler, stearic acid, reinforcing resins, zinc oxide, activators, pigments, vulcanization accelerators or retarders, anti-aging agents, such as anti-oxidants, anti-reversion agents, oils or various agents to facilitate use, tackiness promoting resins, metal adhesion promoters, anti-ozone waxes, silicon binding and/or covering agents, etc.

The compositions according to the invention can be used in a wide variety of applications, notably for numerous rubber products. In particular the compositions are used in tire covers as buffer compositions between a source of oxygen, in particular inflation air or the external atmosphere and a zone to be protected in the tire cover. For example, these compositions may be used inside the internal calendering rubber, between the calendering rubber and the carcass ply, between the carcass ply and the crown plies, between the crown plies and the tread, between the carcass ply and the side walls, or even on the outside of the side walls.

A tire cover according to the invention, wherein the tire cover comprises internal calendering rubber, a carcass ply extending from one bead wire to the other, crown plies, side walls ending in beads comprising at least one bead wire, and a tread, is characterized such that a buffer zone containing the composition of the invention occupies at least one of the following positions: radially inside the said calendering rubber, between the internal calendering and the carcass ply, between the carcass ply and the crown plies, between the crown plies and the tread, between the carcass ply and the side walls, inside or outside the side walls, and inside or outside the tread.

The use of the iron compound according to the invention is very different from the known uses of iron compounds in the rubber industry, such as their use as oxidizing salts to promote the mastication of rubbers (peptizing properties) or devulcanization for recycling, as described, for example, U.S. Pat. No. 3,324,100, European patent application EP 157 079 A and Russian application RU 2,014,339 A.

The process for obtaining a rubber-based product according to the present invention, comprises incorporating the iron (III) salt in the elastomer or elastomers of the buffer composition by working the salt into the elastomer(s) in mechanically to obtain the corresponding buffer zone.

Preferably the iron (III) salt is incorporated into in the said elastomer(s) at the same time as a reinforcing filler is incorporated.

The process for reducing the rolling resistance of a tire cover, comprises incorporating an iron (III) salt as defined above in an elastomer or in the elastomers constituting the tire cover, by working the salt in mechanically.

The invention will be easily understood with the help of the non-limiting examples given below.

These examples are either examples according to the invention, or ones not according to the invention that use compositions without any metallic derivative, or those containing cobalt salts iron (III) salts, other than an iron (III) salt of a carboxylic acid having the formula $C_n.H_{2n}O_2$ in which n is from 2 to 5.

The oxidation-promoting efficacy of the iron or cobalt compounds is assessed by subjecting the compositions to aging by thermal oxidation. The oxygen uptake is then measured by elemental analysis and the changes in mechanical properties, such as the modulus, hysteresis loss and rupture properties, are determined.

Vulcanization

Unless otherwise indicated, all the tests were carried out on compositions that had been vulcanized by curing for 20 to 30 min at 150° C.

Aging by Thermal Oxidation

A ventilated stove at 85° C. is used. This temperature is regarded as representative of the temperatures encountered during the operation of tire covers.

Hysteresis Loss

The hysteresis loss, or hysteresis (Ph) is measured by determining the energy lost on rebound compared with the input energy at 60° C., measured at the sixth shock. The value, expressed as a percentage, is the difference between the energy supplied and the energy returned, referred to the energy supplied. The deformation for the losses measured is 40%.

Tensile Tests

The strain modulus at 10% strain (M10) and at 100% strain (M100) are determined, in accordance with the standard ISO 37.

Scott Fracture Indexes

The rupture stress (Cr) in MPa and the elongation at rupture (Ar) in % are also determined. All these tensile measurements are carried out under normal temperature and humidity conditions according to ISO 37.

EXAMPLES

In the two examples below, the following basic composition is used, which is prepared in known fashion using an internal mixer and then an external mixer. All the figures indicated are parts by weight. The iron (III) salt is introduced into the internal mixer, for example a Banburry, at the same time as the carbon black, the ZnO, the stearic acid and the 6PPD.

| | |
|---|---|
| Natural rubber | 100 |
| Carbon black N326 | 47 |
| Sulphur | 4.5 |
| DCBS | 0.8 |
| ZnO | 7.5 |
| Stearic acid | 0.9 |
| 6PPD | 1.5 | in which:

DCBS: N,N-dicyclohexyl-2-benzothiazolesulphenamide
6PPD: N-1,3-dimethylbutyl-N'-phenyl-paraphenylene diamine.

Starting with this basic composition, the following compositions are prepared for each of the two following examples.

Example 1

Control compositions:

| | |
|---|---|
| Composition T1: | basic composition with no metallic derivative. |
| Composition T2: | basic composition containing 0.25 pbw of cobalt equivalent in the form of cobalt naphthenate. |
| Composition T3: | basic composition containing 0.02 pbw of iron equivalent in the form of ferric acetylacetonate. |

Composition according to the invention

| | |
|---|---|
| Composition I1: | basic composition containing 0.02 pbw of iron equivalent in the form of iron (III) acetate. |

Vulcanization at 150° C., was carried out for 20 minutes for control composition T2 and 30 minutes for the other compositions.

1-a) The strain module M10 and M100 and the hysteresis losses (hysteresis) were determined for each composition. The results are shown in Table I.

TABLE 1

| | T1 | T2 | T3 | I1 |
|---|---|---|---|---|
| M10 (MPa) | 4.5 | 5.8 | 4.5 | 4.5 |
| M100 (MPa) | 2.2 | 2.6 | 2.3 | 2.3 |
| Ph(%) | 17 | 19 | 16.5 | 16.5 |

Table 1 shows that the iron (III) salt of acetic acid, in composition I1 according to the invention, modifies the characteristics of the basic composition less than does cobalt naphthenate in control composition T2, and that the relative hysteresis loss of composition I1 is considerably lower than that of control composition T2.

1-b) Experiments were carried out to demonstrate the ability of composition I1 to fix oxygen after thermal oxidation for 2 weeks at 85° C., compared to control compositions TI, T2 and T3.

The results of these thermal oxidation tests are shown in Table 2 below, which gives the percentage by weight of oxygen fixed.

TABLE 2

| | T1 | T2 | T3 | I1 |
|---|---|---|---|---|
| At 85° C. 2 Weeks | 0.8 | 1.1 | 1.4 | 1.3 |

Table 2 shows that the iron (III) salt of acetic acid enables composition I1 according to the invention to fix a larger amount of oxygen than control composition T2 which contains cobalt naphthenate. Moreover, the amount fixed is substantially larger than that of control composition TI which contains no iron or cobalt compound.

Basic compositions containing other metallic salts described as oxidation promoters in the literature, introduced in amounts so as to give an isomolar quantity of metal in relation to control composition T2 lead to results similar to those obtained with control composition T1 which contains no metallic salt. Such metallic salts include the salts of manganese (II) or (III), in particular the carbonate, acetate or acetylacetonate of manganese (II), manganese (III) acetylacetonate, the salts of molybdenum (IV), in particular molybdenum (IV) sulphide and oxide, the salts of copper (II), in particular copper (II) hydroxide, carbonate, stearate, acetate or acetylacetonate, the salts of chromium (III), in particular chromium acetylacetonate, and cerium (IV) sulphate, 1-c) Experiments were also carried out to determine the moduli and rupture properties and the hysteresis of composition I1 according to the invention compared with control compositions TI, T2 and T3, after treating each composition by of aging by thermal oxidation (at 85° C. for 2 weeks).

The results are given in Table 3, which shows, for each composition, the change in the values of the various parameters compared with those for the same composition before the thermal oxidation treatment.

TABLE 3

| | T1 | T2 | T3 | I1 |
|---|---|---|---|---|
| M10 | +60% | +55% | +61% | +56% |
| M100 | 122% | +111% | — | — |
| Ph | +5.5 | +11 | +8 | +8 |
| Ar | −71% | −78% | −85% | −80% |
| Cr | −63% | −71% | −77% | −73% |

In relation to the results of paragraph 1-b), Table 3 shows that composition I1 according to the invention shows an ability to fix oxygen that is distinctly better than known composition T2, whereas following treatment by thermal oxidation, composition I1 shows mechanical elongation and rupture properties which have evolved almost analogously with the control compositions after thermal oxidation treatment.

Example 2

Control compositions:

Composition T1: basic composition with no metallic derivative.
Composition T2: basic composition containing 0.25 pbw of cobalt equivalent in the form of cobalt naphthenate.
Composition T3: basic composition containing 0.25 pbw of iron equivalent in the form of iron (III) fumarate.
Composition T4: basic composition containing 0.25 pbw of iron equivalent in the form of iron (III) gluconate.
Composition T5: basic composition containing 0.25 pbw of iron equivalent in the form of iron (III) citrate.

Preferred composition according to the invention:

Composition I2: basic composition containing 0.02 pbw of iron equivalent in the form of iron (III) pentanoate.

Vulcanization at 150° C. was carried out for 20 minutes on control composition T2, an 30 minutes for all of the other compositions.

2-a) The strain moduli M10 and M100 and the hysteresis losses (or hysteresis) were determined for each composition. The results are shown in Table 4.

TABLE 4

|  | T1 | T2 | I2 |
|---|---|---|---|
| M10 (MPa) | 4.5 | 5.5 | 4.2 |
| M100 (MPa) | 2.2 | 2.4 | 2.2 |
| Ph(%) | 15.7 | 19.2 | 15.6 |

Table 4 shows that the iron (III) salt of pentanoic acid in composition I2 according to the invention modifies the characteristics of the basic composition less than does the cobalt compound in control composition T2, and that the relative hysteresis loss of composition I2 is considerably smaller than that of the said control composition T2.

2-b) Experiments were carried out to demonstrate the ability of composition I2 to fix oxygen after thermal oxidation for 2 weeks at 85° C., compared to control compositions TI and T2.

The results of these thermal oxidation tests are shown in Table 5, which gives the percentage by weight of oxygen fixed.

TABLE 5

|  | T1 | T2 | I2 |
|---|---|---|---|
| At 85° C. 2 Weeks | 0.9 | 1.1 | 1.4 |

Table 5 shows that the iron (III) salt of pentanoic acid enables composition I2 according to the invention to fix a larger amount of oxygen than control composition T2 which contains cobalt. Moreover, the amount fixed is substantially larger than that of control composition TI which contains no iron or cobalt compound.

Basic compositions containing other metallic salts described as oxidation promoters in the literature, introduced in amounts such as to give an isomolar quantity of metal in relation to control composition T2 lead to results similar to those obtained with control composition TI which contains no metallic salt. Such metallic salts include the salts of manganese (II) or (III), in particular the carbonate, acetate or acetylacetonate of manganese (II), manganese (III) acetylacetonate, the salts of molybdenum (IV), in particular molybdenum (IV) sulphide and oxide, the salts of copper (II), in particular copper (II) hydroxide, carbonate, stearate, acetate or acetylacetonate, the salts of chromium (III) and in particular chromium acetylacetonate, and cerium (IV) sulphate.

2-c) Experiments were also carried out to determine the moduli and rupture properties and the hysteresis of composition I2 according to the invention compared with the control compositions T1 and T2, after applying to each composition the aforesaid treatment of ageing by thermal oxidation (at 85° C. for 2 weeks).

The results are given in Table 6 below, which shows, for each composition, the change in the values of the various parameters compared with those for the same composition before the thermal oxidation treatment.

TABLE 6

|  | T1 | T2 | I2 |
|---|---|---|---|
| M10 | +46% | +60% | +75% |
| M100 | 113% | 129% | — |
| Ph | +7% | +8% | — |
| Ar | −74% | −79% | −87% |
| Cr | −64% | −68% | −80% |

In relation to the results of paragraph 2-b), Table 6 shows that composition I2 according to the invention shows an ability to fix oxygen that is distinctly better than known compositions T1 and T2, whereas following treatment by thermal oxidation, composition I2 shows mechanical elongation and rupture properties which have evolved almost analogously with the control compositions after the thermal oxidation treatment.

2-d) The quantity of oxygen fixed in the compositions not according to the invention which contain iron compounds (compositions T3 to T5) was determined.

Oxygen fixation tests following thermal oxidation treatment as in paragraph 2-b) were carried out.
The results are given in Table 7, whose presentation is analogous to that of Table 5 (percent by weight of oxygen fixed).

TABLE 7

|  | T1 | T2 | T3 | T4 | T5 |
|---|---|---|---|---|---|
| At 85° C. 2 Weeks | 0.9 | 1.1 | 0.9 | 0.9 | 0.9 |

It is apparent that control compositions T3 to T5, which contain iron compounds not according to the invention, have a lower ability to fix oxygen than control composition T2 containing a cobalt derivative, and approximately the same ability as composition TI which contains no metallic salt.

It can be readily seen from the above examples that a rubber composition according to the invention, i.e. ones containing an iron (III) salt of a carboxylic acid having the general formula $C_nH_{2n}O_2$ in which n is from 2 to 5 (I1, iron (III) acetate; I2, iron (III) pentanoate), makes possible a considerable reduction in metal content in the compositions compared with known rubber compositions, while at the same time appreciably improving oxygen fixation characteristics.

It can also be seen from the examples that a rubber composition according to the invention is characterized by hysteresis losses which are much lower compared with those of known compositions.

It follows that the use of a rubber composition according to the invention in a tire cover makes it possible, to significantly reduce the rolling resistance of the tire as well as to improve its endurance.

The invention is not limited to the examples described above.

What is claimed is:

1. A tire comprising, from the inside to the outside, an inner layer of rubber defining the inner cavity of the tire, a carcass ply, crown plies and a tread, at least one intermediate layer of rubber being provided between the inner layer and the carcass ply and/or between the carcass ply and the crown plies and/or between the crown plies and the tread, wherein said intermediate layer comprises a rubber composition intended to trap oxygen that comprises from 0.01 to 0.03 parts by weight per 100 parts by weight of elastomer(s) in equivalent iron of at least one iron (III) salt of a carboxylic acid having the general formula $C_nH_{2n}O_2$ in which n is from 2 to 5 and being designed to activate oxidation in said composition.

2. A tire according to claim 1, wherein the salt is iron (III) acetate.

3. A tire according to claim 1, wherein the salt is iron (III) pentanoate.

4. A tire according to claim 1, wherein said composition comprises natural rubber or synthetic polyisoprene.

5. A tire according to claim 1, wherein said intermediate layer of rubber is provided between the inner layer and the carcass ply.

6. A tire according to claim 5, wherein it is a tire for a heavy vehicle.

7. A method for making a tire comprising, from the inside to the outside, an inner layer of rubber defining the inner cavity of the tire, a carcass ply, crown plies and a tread, at least one intermediate layer of rubber being provided between the inner layer and the carcass ply and/or between the carcass ply and the crown plies and/or between the crown plies and the tread, said intermediate layer comprising a rubber composition intended to trap oxygen, the method comprising incorporating by mechanical working into said composition from 0.01 to 0.03 parts by weight per 100 parts by weight of elastomer(s) in equivalent iron of at least one iron (III) salt of a carboxylic acid having the general formula $C_nH_{2n}O_2$ in which n is from 2 to 5 and being designed to activate oxidation in said composition.

8. A method for making a tire according to claim 7, further comprising incorporating a reinforcing filler into said composition at the same time as the iron (III) salt.

9. A method for reducing the rolling resistance of a tire comprising, from the inside to the outside, an inner layer of rubber defining the inner cavity of the tire, a carcass ply, crown plies and a tread, at least one intermediate layer of rubber being provided between the inner layer and the carcass ply and/or between the carcass ply and the crown plies and/or between the crown plies and the tread, said intermediate layer comprising a rubber composition intended to trap oxygen, the method comprising preparing the intermediate layer by mechanical working into said composition from 0.01 to 0.03 parts by weight per 100 parts by weight of elastomer(s) in equivalent iron of at least one iron (III) salt of a carboxylic acid having the general formula $C_nH_{2n}O_2$ in which n is from 2 to 5 and being designed to activate oxidation in said composition.

* * * * *